United States Patent [19]

Curtze

[11] Patent Number: 4,726,110
[45] Date of Patent: Feb. 23, 1988

[54] METHOD OF SUPPORTING A WINDOW ASSEMBLY

[75] Inventor: Edward W. Curtze, Perrysburg, Ohio

[73] Assignee: Libbey-Owens-Ford Co., Toledo, Ohio

[21] Appl. No.: 5,464

[22] Filed: Jan. 20, 1987

Related U.S. Application Data

[62] Division of Ser. No. 844,577, Mar. 27, 1986, Pat. No. 4,679,525.

[51] Int. Cl.$^4$ .............................................. B23Q 7/00
[52] U.S. Cl. .................................... 29/559; 29/527.2; 427/282
[58] Field of Search ............... 29/559, 527.2; 427/282, 427/421; 118/500–503; 269/302, 287, 296; 206/448, 557; 901/43

[56] References Cited

U.S. PATENT DOCUMENTS

| | | | |
|---|---|---|---|
| 3,380,834 | 4/1968 | Janovtchik et al. | 206/557 X |
| 3,873,342 | 3/1975 | Ellison | 427/282 X |
| 3,934,063 | 1/1976 | Dubble | 427/282 X |
| 4,213,698 | 7/1980 | Firtion et al. | 29/559 |
| 4,444,809 | 4/1984 | Rau | 427/282 X |
| 4,474,136 | 10/1984 | Alheritiere | 118/500 X |
| 4,578,281 | 3/1986 | Ebisawa et al. | 427/282 X |
| 4,672,914 | 6/1987 | Sari | 118/500 X |

*Primary Examiner*—Charlie T. Moon
*Attorney, Agent, or Firm*—Marshall & Melhorn

[57] ABSTRACT

A fixture for supporting and masking an ecapsulated window assembly includes a generally planar floor having a periphery surrounded by generally upstanding walls. An upper edge of the walls engages an inner surface of a gasket formed on a periphery of the window assembly whereby the fixture masks the inside surfaces of the gasket and a glass sheet forming the window assembly. At least one aperture is formed in the fixture for receiving a reference pin utilized to locate the fixture with respect to a painting apparatus. A sensor is provided for generating a signal representing the engagement of the aperture by the reference pin and a control unit is responsive to the sensor signal for controlling a robot painting apparatus to spray paint an outer surface of the gasket. The fixture further is used to support the window assembly during curing of the paint and subsequent manufacturing operations.

2 Claims, 5 Drawing Figures

METHOD OF SUPPORTING A WINDOW ASSEMBLY

This application is a division of application Ser. No. 844,577, filed Mar. 27, 1986, now U.S. Pat. No. 4,679,525.

BACKGROUND OF THE INVENTION

This invention generally relates to fixtures for supporting and transporting articles during a manufacturing process and, in particular, to a fixture for retaining and masking an encapsulated window assembly during a painting process and subsequent operations.

In the prior art, there are many means and methods for retaining windows in the body of an automobile. In particular, where the sheet of glass is to be fixed in an opening, some form of adhesive is utilized to adhere the edge of the sheet of glass to the periphery of the opening and then clips and moldings are utilized to cover the joint between the glass and the vehicle body.

The prior art assembly methods are now being replaced by a method utilizing a window assembly having its peripheral edge encapsulated in a preformed gasket. Thus, the new window assembly can be installed in an opening in a vehicle body utilizing adhesive without the previous requirement for trim strips or other articles to cover the joint between the window assembly and the vehicle body. However, the gasket is typically formed of a urethane material which is sensitive to ultraviolet light. If the gasket were to remain exposed, it would soon begin to discolor and deteriorate. Thus, the exposed surface of the gasket is typically coated with a protective urethane based paint. The urethane based paint is compatible with the urethane gasket, but resists the detrimental effect of ultraviolet radiation.

Since the exposed surfaces of the gasket represent a very small portion of the total surface of the window assembly, there is created a problem of adequately supporting the window assembly during the painting operation while masking the surfaces which are not to be painted. Furthermore, the paint typically contains an isocyante which is toxic and requires a relatively long curing time. Thus, any fixture utilized to handle the window assembly must be available during painting and drying. Furthermore, since the paint is unhealthy for humans, the painting operation is typically performed by robots and the fixture must be designed so as to allow access by a painting robot to the surfaces to be painted.

SUMMARY OF THE INVENTION

The present invention concerns a fixture for holding an article, such as a window assembly, during painting and curing operations in a manufacturing process. The fixture is formed with a pan shape having a peripheral upper edge which engages a surface of a gasket formed about the periphery of a sheet of glass thereby supporting the window assembly and exposing another surface of the gasket to be painted. One or more registration means are formed in or on the pan to be engaged by a locating device. The locating device provides a reference point for a spray painting robot which is then guided along the proper path to paint the exposed surface of the gasket. After the painting operation, the window assembly and fixture can be moved as a unit to other operation stations such as a paint flash off oven, a paint curing oven, a fan cooling station, a de-masking station, and an inspection and packing station. At the end of the assembly process, the window assembly is removed from the fixture and the fixture is returned to the station on the assembly line where a new window assembly is inserted and the process is repeated.

BRIEF DESCRIPTION OF THE DRAWINGS

The above, as well as other advantages of the present invention, will become readily apparent to those skilled in the art from the following detailed description of a preferred embodiment when considered in light of the accompanying drawings, in which.

DESCRIPTION OF THE PREFERRED EMBODIMENT

Figure 1:
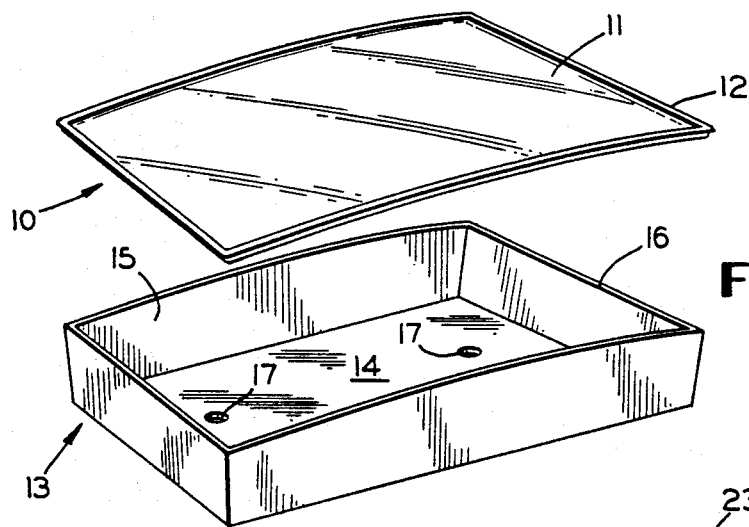
FIG. 1 is a perspective view of a fixture according to the present invention and an encapsulated window assembly to be inserted into the fixture.

There is shown in FIG. 1 an encapsulated window assembly 10 including a sheet of glass 11, such as a windshield for a vehicle, and a gasket 12 surrounding the periphery of glass sheet 11. The gasket 12 is typically formed of a urethane material and is molded in situ on the glass sheet. Thus, the window assembly 10 can be installed as a unit in a suitable opening in a vehicle body utilizing an adhesive material.

However, in order to protect the outwardly facing surfaces of the gasket 12 from the effects of ultraviolet radiation, these surfaces must be painted. During the painting process, the window assembly 10 must be held in position with respect to a painting apparatus. Furthermore, after the painting operation, the window assembly 10 must be transported to a curing area or station. According to the present invention, there is provided a fixture 13 which supports the window assembly 10, masks and seals the inwardly facing surfaces of the glass sheet 11 and gasket 12, and provides reference means for controlling the painting apparatus during the painting operation. Furthermore, the window assembly 10 can be transported to other stations for subsequent operations utilizing the fixture 13.

Fixture 13 includes a generally planar floor 14 surrounded at its periphery by generally upstanding walls 15 to form a pan-shaped structure. An upper edge 16 of the walls 15 engages an inwardly facing surface of the gasket 12 when the window assembly 10 is inserted into the opening defined by the walls 15. Thus, the walls 15 and the floor 14 mask the inwardly facing surfaces of the gasket 12 and the glass sheet 11 during any painting operations. One or more reference apertures 17 are formed in the floor 14 to provide a locating means for controlling the path of a painting apparatus. However, the apertures could also be formed in the walls 15. Furthermore, any suitable reference means could be utilized such as protruding pins.

Figure 2:
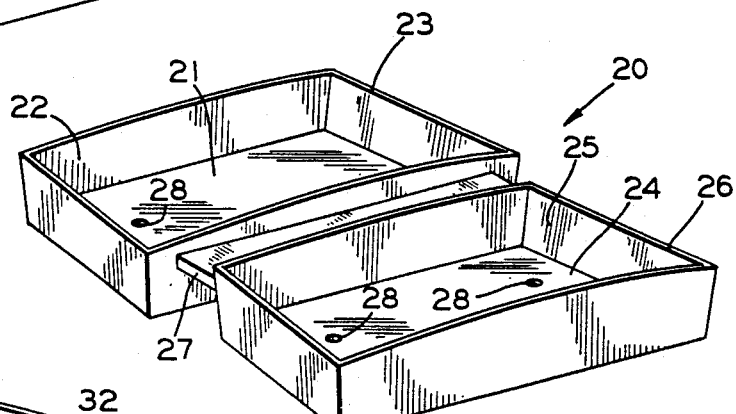
FIG. 2 is a perspective view of a multi-cavity fixture according to the present invention.

There is shown in FIG. 2 a multi-cavity fixture 20 which includes two pan-shaped window assembly receiving areas. A first pan has a floor 21 and generally upstanding walls 22 defining an upper edge 23 for engaging an inner surface of a gasket on a window assembly. A second pan-shaped structure includes a floor 24 surrounded by an upstanding wall 25 defining an upper edge 26 for engaging a second window assembly. The two pans are positioned adjacent one another and the edges 23 and 26 are connected by a flange 27. One or more reference apertures 28 can be formed in the floor 21 and/or the floor 24. Although the fixture 20 is shown with two cavities, it can be formed with any number of desired cavities, connected together in any pattern. The fixture 20 can be utilized when processing a plurality of similar window assemblies.

Figure 3:
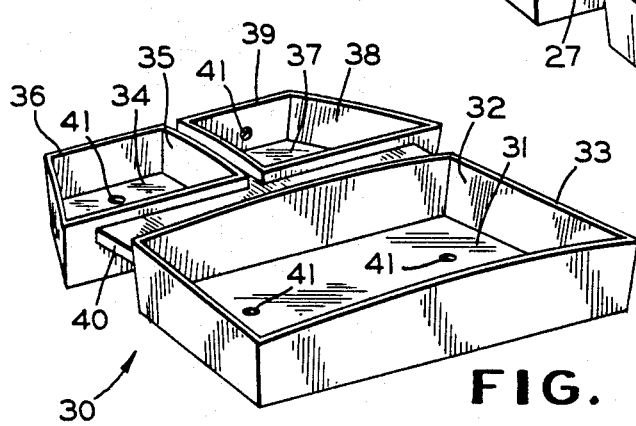
FIG. 3 is a perspective view of another form of multi-cavity fixture according to the present invention.

There is shown in FIG. 3 a multi-cavity fixture for receiving more than one configuration of window assembly. A fixture 30 includes a first cavity having a floor 31 surrounded by generally upstanding walls 32 terminating in edge 33 for engaging a gasket on a window assembly. A second cavity is formed with a floor 34 surrounded by upstanding walls 35 terminating in an upper edge 36. A third cavity has a floor 37 surrounded by upstanding walls 38 terminating in an upper edge 39. The three cavities can be connected by a flange 40. The fixture 30 represents a fixture for retaining the various window assemblies which might be utilized in a single vehicle. For example, the first cavity can retain a windshield while the second and third cavities can contain a pair of side windows. Various other cavities can be added such that a complete set of window assemblies for one vehicle is retained in the same fixture. Such a fixture has the advantage of permitting all of the gaskets to be painted at the same time with the same color. One or more reference apertures 41 can be formed in the floor or wall of any one or more of the cavities.

Figure 4:
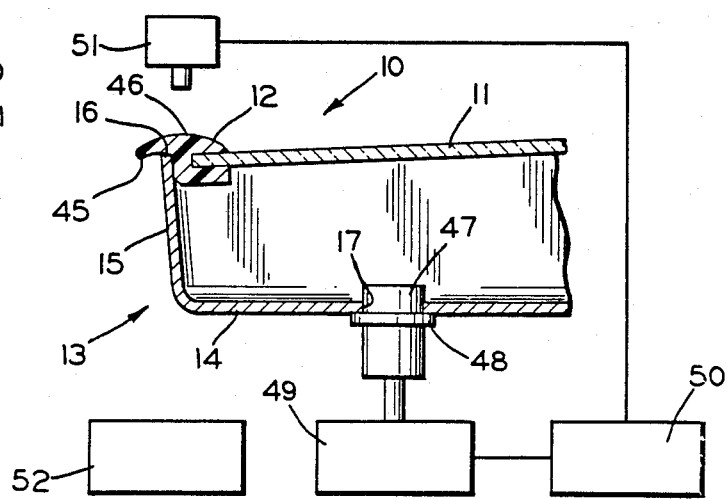
FIG. 4 is a fragmentary cross-sectional view of a fixture and window assembly and a schematic of a fixture registration and painting control according to the present invention.

There is shown in FIG. 4 an enlarged fragmentary cross-sectional view of the window assembly 10 and the fixture 13 along with a schematic representation of a reference and control circuit for an apparatus for painting an outer surface of the gasket 12. An inner surface 45 of the gasket 12 rests upon and seals the upper edge 16 of the fixture 13. Thus, the floor 14 and the walls 15 of the fixture 13 and the window assembly 10 form a closed structure to mask the inner surfaces of the glass sheet 11 and the gasket 12 during the painting operation. An outer surface 46 of the gasket 12 is exposed to be painted. A registration pin 47 extends through the reference aperture 17. The pin 47 can be provided with an annular flange 48 which can serve both as a stop against the outer surface of the floor 14 and a seal for preventing paint from entering the aperture 17. The pin 47 is connected to a sensor 49 which determines when the pin 47 has been inserted into the aperture 17 and the floor 14 has engaged the annular flange 48. Any type of commercially available sensor can be utilized such as strain gages and the like.

When the sensor 49 has determined that the pin 47 has engaged the aperture 17, a signal is set to a control unit 50. The control unit 50 is connected to a spray painting apparatus 51 which can be a commercially available industrial robot attached to a spray painting device. The control unit 50 is preprogrammed to guide the spray painting apparatus 51 along a path to apply a paint coating to the outer surface 46 of the gasket 12. Typically, a suitable mask (not shown) is provided for the outer surface of the glass sheet 11 during the painting operation. Also, the walls 15 can be tapered inwardly from the edge 16 to the floor 14 such that any overspray is directed toward a conventional water spray device 52. At the conclusion of the painting operation, the fixture 13 can be removed from the pin 47 and transported with the window assembly 10 to a station for a subsequent operation. Thus, fixture 13 provides an apparatus for transporting the window assembly as the paint coating cures. After a final operation, the window assembly 10 is removed from the fixture 13 for inspection and packing and the fixture is returned to the painting station to be reused.

Figure 5:
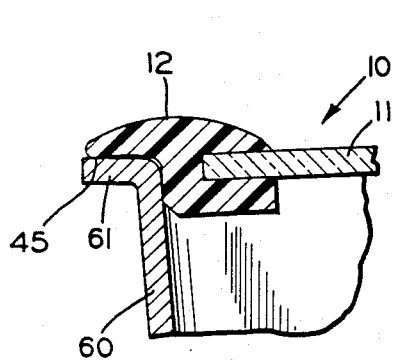
FIG. 5 is a fragmentary sectional view of an alternate embodiment of the fixture according to the present invention.

There is shown in FIG. 5 a fragmentary cross-sectional view of an alternate embodiment of the fixture according to the present invention. An upstanding wall 60 corresponds to the wall 15 shown in FIG. 4. However, the upper edge of the wall 60 terminates in a generally normally extending flange 61 for supporting the inner surface 45 of the gasket 12. The flange 61 provides an additional supporting surface as compared with the upper edge 16 shown in FIG. 4 and also tends to mask more of the inner surface 45 during the painting operation.

Since many window assemblies utilize curved or bent glass, the upper edges of the walls of the fixture must be contoured to maintain a snug fit with the inner surfaces of the gaskets and seal the inner surface of the window assembly. Also, the fixture according to the present invention supports the window assembly on the opposite side from the surface to be painted so that the fixture does not interfere with the movement of the robot and spray painting device during the painting operation. Although the walls have been shown as extending from a periphery of the floor, they can also be spaced inwardly. Furthermore, although the floor of the fixture has been shown as being planar, it can be formed with any suitable shape.

In accordance with the provisions of the patent statutes, the principle and mode of operation of the present invention have been described in what is considered to represent the preferred embodiment. However, it should be understood that the invention may be practiced otherwise than as specifically illustrated and described without parting from its spirit or scope.

What is claimed is:

1. A method of supporting a window assembly for a gasket painting operation, the window assembly including at least one glass sheet having a predetermined portion thereof encapsulated by a gasket formed aroud the periphery of said glass sheet, the glass sheet and the gasket each having inner and outer surfaces, comprising the steps of:
    (a) providing a floor;
    (b) providing an upstanding continuous wall extending from said floor and having an upper edge defining a window assembly supporting surface, said floor and said wall defining a window assembly supporting fixture;
    (c) forming at least one reference means in said fixture to locate same with respect to a predetermined gasket painting position; and
    (d) engaging an inner surface of a gasket formed on a periphery of a glass sheet of a window assembly with said upstanding wall upper edge whereby said fixture masks from a gasket painting operation an inner surface of the gasket and an inner surface of a glass sheet of the window assembly.

2. The method according to claim 1 wherein said step (c) is performed by forming at least one aperture in said fixture and including a step of extending a pin through said aperture to locate said fixture with respect to a predetermined painting position.

* * * * *